(12) United States Patent
Hackel

(10) Patent No.: US 11,584,969 B2
(45) Date of Patent: *Feb. 21, 2023

(54) HIGH FATIGUE STRENGTH COMPONENTS REQUIRING AREAS OF HIGH HARDNESS

(71) Applicant: METAL IMPROVEMENT COMPANY, LLC, Paramus, NJ (US)

(72) Inventor: Lloyd A. Hackel, Livermore, CA (US)

(73) Assignee: METAL IMPROVEMENT COMPANY, LLC, Paramus, NJ (US)

( * ) Notice: Subject to any disclaimer, the term of this patent is extended or adjusted under 35 U.S.C. 154(b) by 322 days.

This patent is subject to a terminal disclaimer.

(21) Appl. No.: 16/815,579

(22) Filed: Mar. 11, 2020

(65) Prior Publication Data
US 2020/0208233 A1 Jul. 2, 2020

Related U.S. Application Data

(63) Continuation-in-part of application No. 15/094,173, filed on Apr. 8, 2016, now Pat. No. 10,619,222.
(Continued)

(51) Int. Cl.
*C21D 7/04* (2006.01)
*C22F 1/18* (2006.01)
(Continued)

(52) U.S. Cl.
CPC ............... *C21D 7/04* (2013.01); *C21D 1/09* (2013.01); *C22F 1/183* (2013.01); *C23C 8/22* (2013.01); *C23C 8/26* (2013.01); *C21D 2221/00* (2013.01)

(58) Field of Classification Search
CPC .... C23C 8/04; C23C 8/02; C23C 8/20; C23C 8/24; C23C 8/30; C23C 8/36; C21D 1/18;
(Continued)

(56) References Cited

U.S. PATENT DOCUMENTS

| 4,386,458 A | 6/1983 | Evans |
| 4,539,461 A | 9/1985 | Benedict et al. |

(Continued)

FOREIGN PATENT DOCUMENTS

| JP | H0551629 | * | 3/1993 |
| JP | H0551629 A | | 3/1993 |

(Continued)

OTHER PUBLICATIONS

Fuller, A. et al. "Carburizing." 2017. ASm Handbooks, vol. 18. Friction, Lubrication, and Wear technology, p. 634-637 (Year: 2017).*

(Continued)

*Primary Examiner* — Nicholas A Wang
(74) *Attorney, Agent, or Firm* — Haynes Beffel & Wolfeld LLP; Andrew L. Dunlap

(57) ABSTRACT

Metal components subject to wear or contact fatigue in a first area, and subject to bending, axial and/or torsional stress loading in a second area comprise a surface hardened, first surface layer in the first area, and a surface compressive-stress treated, second surface layer in the second area. The second surface layer has a material hardness different from, and typically lower than, the first surface layer, and induced residual compressive stress to improve fatigue strength. Example components described include a gear, a cog, a pinion, a rack, a splined shaft, a splined coupling, a torqueing tool and a nut driving tool. A hybrid manufacturing process is described, including area-selective surface hardening combined with a process to add compressive stress to fatigue failure prone areas.

25 Claims, 6 Drawing Sheets

Related U.S. Application Data

(60) Provisional application No. 62/144,776, filed on Apr. 8, 2015.

(51) Int. Cl.
  *C23C 8/22* (2006.01)
  *C23C 8/26* (2006.01)
  *C21D 1/09* (2006.01)

(58) Field of Classification Search
  CPC ... C21D 1/42; C21D 7/06; C21D 7/08; C21D 1/09; C21D 2221/00; C21D 7/04
  USPC .......................................................... 148/207
  See application file for complete search history.

(56) References Cited

U.S. PATENT DOCUMENTS

| | | | |
|---|---|---|---|
| 5,492,447 | A | 2/1996 | Mannava et al. |
| 5,522,706 | A | 6/1996 | Mannava et al. |
| 5,625,664 | A | 4/1997 | Berkley |
| 5,846,054 | A | 12/1998 | Mannava et al. |
| 5,916,383 | A | 6/1999 | Rokutanda et al. |
| 6,013,140 | A | 1/2000 | Simoneaux |
| 7,393,498 | B2 | 7/2008 | Skoglund et al. |
| 7,416,696 | B2 | 8/2008 | Kosco |
| 7,703,312 | B2 | 4/2010 | David |
| 7,750,266 | B2 | 7/2010 | Dane et al. |
| 10,619,222 | B2 | 4/2020 | Hackel |
| 2002/0182438 | A1 | 12/2002 | Wakita et al. |
| 2004/0226637 | A1 | 11/2004 | Dulaney et al. |
| 2005/0158460 | A1 | 7/2005 | Williams |
| 2008/0105021 | A1 | 5/2008 | Hodjat |
| 2010/0051141 | A1 | 3/2010 | Bhambri |
| 2010/0200123 | A1 | 8/2010 | Kirkwood et al. |
| 2010/0300168 | A1* | 12/2010 | Ishikura ................... B24C 1/10 72/53 |
| 2012/0085465 | A1* | 4/2012 | Neishi ...................... C23C 8/64 148/211 |
| 2013/0306194 | A1 | 11/2013 | Chin et al. |
| 2014/0208861 | A1 | 7/2014 | Ehinger et al. |
| 2014/0216723 | A1 | 8/2014 | Badrak |
| 2014/0255198 | A1 | 9/2014 | El-Wardany et al. |
| 2014/0326092 | A1 | 11/2014 | Tokozakura et al. |

FOREIGN PATENT DOCUMENTS

| | | | |
|---|---|---|---|
| JP | 2007169753 | * | 7/2007 |
| JP | 2007169753 | A | 7/2007 |
| KR | 100595105 | * | 3/1998 |
| KR | 100591505 | B1 | 8/2006 |

OTHER PUBLICATIONS

Wieczorek, A. "Experimental studies on abrasive wear of surface-hardened and shot peened alloy cast steels." 2016. Key Engineering Materials. 674. p. 201-206. (Year: 2016).*

Schneider et al., "Introduction to Surface Hardening of Steels," ASM Handbook, vol. 4A, 2013, at least as early as Dec. 2013, 10 pages.

ASM Handbook, vol. 4A, Steel Heat Treating Fundamentals and Processes J. Dossett and G.E. Totten, editors DOI: 10.31399/asm.hb.v04a.a0005793 "Plasma Carburizing" (Year: 2013).

Fatigue Resistance of Steels by Bruce Boardman, Deere and Company Technical Center, ASM Handbook, vol. 1: Properties and Selection, Irons, Steels and High-Performance Alloys, ASM Handbook Committee, pp. 673-688, 1990.

Frazier, W. "metal additive manufacturing: a review" Apr. 8, 2014. Journal of Materials Engineering and Performance. 23(6). p. 1917-1928 (Year: 2014).

J. Kritzler and W. Wubbenhorst, Inducing Compressive Stresses through Controlled Shot Peening. Approved by the ASM Handbook Committee for addition to the (Year: 2013).

JR. Davis, Surface Engineering of Carbon and Alloy Steels, Surface Engineering, vol. 5, ASM Handbook, ASM International, 1994, p. 701-740 (Year: 1994).

PCT Search Report and Written Opinion in PCT/US2016/026741 dated Jul. 25, 2016, 16 pages.

S. Lampman, Introduction to Surface Hardening of Steels, Heat Treating, vol. 4, ASM Handbook, ASM International, 1991, p. 259-267 (Year: 1991).

Selection of Carburizing Steels, Heat Treating of Irons and Steels, vol. 4D, Asm Handbook, ASM International, 2014, p. 68-75. (Year: 2014).

Shigley, "Mechanical Engineering Design", McGraw-Hill Book Company 1963, p. 380, Figure 11-1.

Wikipedia "Case-hardening" https://en.wikipedia.org/wiki/Case-hardening, 5 pages, last modified on Mar. 28, 2016.

Wikipedia, "Tool steel" https://en.wikipedia.org/wiki/Tool_steel, 7 pages, last modified on Mar. 28, 2016.

* cited by examiner

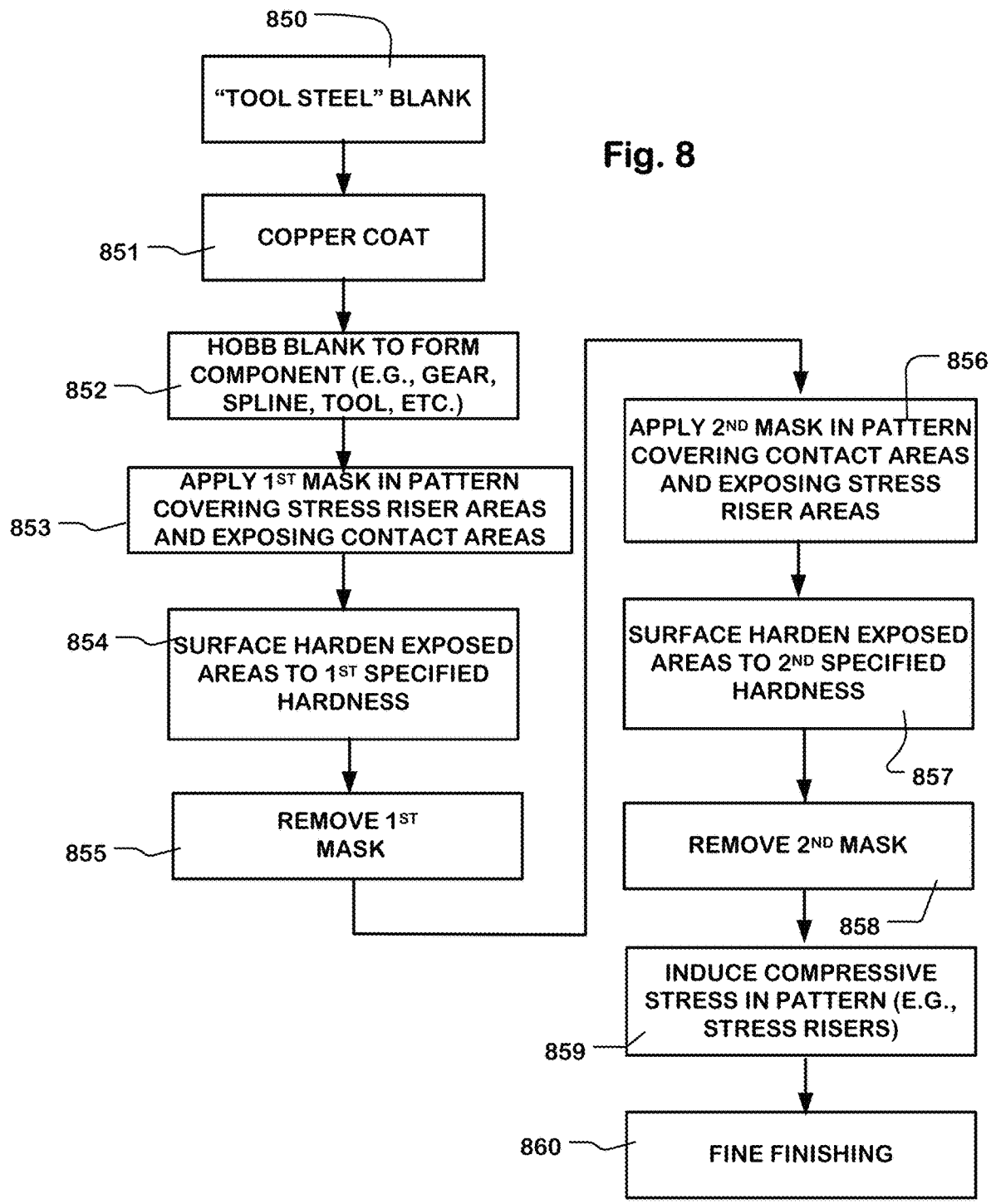

HIGH FATIGUE STRENGTH COMPONENTS REQUIRING AREAS OF HIGH HARDNESS

This application is a continuation-in-part of U.S. patent application Ser. No. 15/094,173, filed 8 Apr. 2016; which claims benefit of U.S. Provisional Patent Application No. 62/144,776, filed 8 Apr. 2015.

BACKGROUND

Technological Field

The present technology relates to high fatigue strength components requiring areas of high hardness, and to methods of manufacturing such components.

Description of Related Art

Some metal components have contact surfaces that are subject to wear. In some components, the contact surfaces of the components are subjected to a surface hardening treatment to improve wear resistance. However, surface hardening treatments can limit or compromise the fatigue strength of such components.

For example, gears have contact faces that can be subjected to surface hardening techniques. See Shigley, "Mechanical Engineering Design", McGraw-Hill Book Company 1963, p 380, FIG. 11-1. At the root of the tooth, the transition geometry from the tooth to the base of the gear called the root radius (or fillet radius in Shigley), results during mechanical loading in a concentration of stress, and in a change of direction of stress and consequently an increased stress in this area. Features of components that cause concentration of stress are termed "stress risers." When one gear drives another, the gear teeth do not contact each other in this root radius area, so wear is not a concern. However, this area on each gear tooth receives tensile loading due to the bending moment created during the driving of the gear. One problem with selective hardening (generally the selective hardening is focused on increasing hardening) of the contact faces arises because selective hardening can result in somewhat lower fatigue strength in areas not subject to contact and wear.

In the usual manufacturing of gears and similar components, carburization or nitriding can be employed for surface hardening. Areas such as the faces, flanks and root radii are equally treated to add desired hardness to the faces and flanks and compressive residual stress to all areas including the root radii. Although these surface hardening treatments like carburization add yield strength and compressive stress, the additional hardening only increases fatigue strength up to a point where additional hardness reduces the ductility and thus the fracture toughness and corresponding fatigue strength. A simple description is that the material becomes brittle. This reduction of fatigue strength is undesired in the areas that flex or torque.

The root radii areas of gear teeth, pinions, splines, crankshafts etc. need fatigue strength and not so much hardness; fatigue strength is needed because the root takes the bending load on the tooth or the torsion of the shaft. Hardness is not needed because the teeth or connecting rods do not contact there. Carburizing in the root radius area is typically done because it increases the yield strength and adds deep compressive stress which the gear industry desires. However, generating compressive stress by carburization increases the material hardness. Above certain levels this increased hardness reduces ductility and thus fracture toughness.

In an article "Fatigue Resistance of Steels by Bruce Boardman, Deere and Company Technical Center, ASM Handbook, Volume 1: Properties and Selection, Irons, Steels and High-Performance Alloys, ASM Handbook Committee, pp. 673-688, 1990, the author states "Studies have shown that the fatigue strength of steels is usually proportional to hardness and tensile strength; this generalization is not true, however, for high tensile strength values where toughness and critical flaw size may govern ultimate load carrying ability." In the paper the author states that "for medium-carbon steel, a higher hardness (or strength) may not be associated with improved fatigue behavior in a low-cycle regime (<103 cycles) because ductility may be a more important factor. The author recognizes the problem but does not propose a solution.

As an example, the FIG. 26 from the Boardman paper shows (alternating) fatigue strength in MegaPascals (MPa) vs tensile strength for 4340 steel. The figure shows for the 90% survival curve an increase in tensile strength of 550 MPa (80 thousand pounds per square inch (ksi)) from approximately 1300 MPa (186 ksi) to 1850 MPa (264 ksi) provides only an increase in fatigue strength from 450 MPa (64 ksi) to about 575 mPa (82 ksi). That is an increase of only 125 MPa (18 ksi) in fatigue strength from an increase of 550 MPa in tensile strength.

FIG. 16 from Boardman's paper, shows the fatigue limit (i.e. fatigue strength) of a number of 4000 series steels as a function of hardness. The chart shows that, as the hardness approaches the higher values, fatigue strength does not increase with increased hardness (and thus increased yield strength) but actually begins to level off and even decrease as hardness reaches the level of 50 HRC and above, hardness levels typically used for gears. The loss in ductility as the hardness is increased reduces the fracture toughness and thus reduces the fatigue strength.

One can make a further observation with reference to a chart found at the website Varmintal.com/arock.htm, where a Figure shows a typical curve for 4000 series steels. This reference shows, over an increased range of hardness from 35 HRC to 49 HRC (HRC is an abbreviation for Rockwell Hardness scale C), the tensile strength increases by about 80 ksi. Boardman suggests a fatigue strength increase of only 18 ksi for this gain in yield strength and hardness, not considering any debit from a decrease in fracture toughness due to the increased hardness. Above 50 HRC the increase in yield strength continues to saturate with increasing hardness.

It is desirable to provide components with surface hardened areas having improved fracture toughness and fatigue strength.

SUMMARY

Metal components and an approach for manufacturing of such components are described, where the components can have high hardness for wear in contact areas, and high fatigue strength in separate areas that carry bending, axial and/or torsional loading. Components which can benefit from technologies described herein include but are not limited to, gears, cogs, pinions, splined shafts, splined couplings, racks, and nut driving tools.

A hybrid manufacturing process is described, including area-selective surface hardening combined with a process to add compressive stress to fatigue failure prone areas.

Metal components are described that are subject to wear or contact fatigue in a first area, and subject to bending, axial and/or torsional stress loading in a second area. The metal component comprises a surface hardened, first surface layer of the component in the first area so that at least part of the first area has increased hardness; and a surface compressive-stress treated, second surface layer of the component in the second area. Thus, the at least part of the second area, in which the second surface layer is disposed, has a hardness and a residual compressive stress different from the first surface layer. Example components described include a gear, a cog, a pinion, a rack, a splined shaft, a splined coupling, and a torqueing tool like a nut driving tool.

The methods described include applying an area-selective hardening treatment to harden a first surface layer of the component, such as by carburizing, nitriding, induction hardening, flame hardening, laser hardening or otherwise, in a first area that can be subject to heavy contact-wear loading. Also, the methods described include applying a different second surface treatment which imparts residual compressive stress in a second area that can be subject to high bending, flexing and/or torsion loading. The second surface treatment can include such processes as laser peening, low plasticity burnishing, shot peening, roller burnishing, cavitation peening or similar treatments involving plastic deformation applied at the surface, typically below a recrystallization temperature. These processes can induce compressive stress without reducing fracture toughness by any significant amount, that is, without increasing brittleness of the material. These processes can induce compressive stress while maintaining high fracture toughness.

A hybrid manufacturing process is described, including an area-selective surface hardening treatment to achieve a first hardness level in a first area, excluding a second area, a second surface hardening treatment to achieve a second hardness level in the second area, combined with a process to add compressive stress to fatigue failure prone areas in the second area. The second surface hardening treatment can also be area-selective, hardening the second area while excluding the first area. Using first and second surface hardening techniques enables tuning of the hardness levels in areas of higher contact stress, to higher hardness, while tuning the hardness levels in areas of high fatigue strength to lower hardness. The higher hardness in the first areas can provide for high yield strength, with a hardness in a range above that desired for high fatigue strength, while the lower hardness in the second areas can be closer to a hardness desired for good fatigue strength of the material. For example, in the case of 4000 series steels as discussed above, the first hardness level can be above 50 HRC, such as 60 or 80 HRC, while the second hardness level can be tuned using the second hardening treatment combined with the process to add compressive stress to be close to 50 HRC. Of course, these levels of hardness can be set according to the materials used and the component being manufactured.

Other aspects and advantages of the technology described herein can be seen on review of the drawings, the detailed description and the claims, which follow.

BRIEF DESCRIPTION OF THE DRAWINGS

FIG. 8 is a simplified flowchart of yet another alternative method for manufacturing a component such as illustrated in FIGS. 1, 3, 4, and 5.

DETAILED DESCRIPTION

A detailed description of embodiments of the technology is provided with reference to the FIGS. 1-8.

Figure 1:
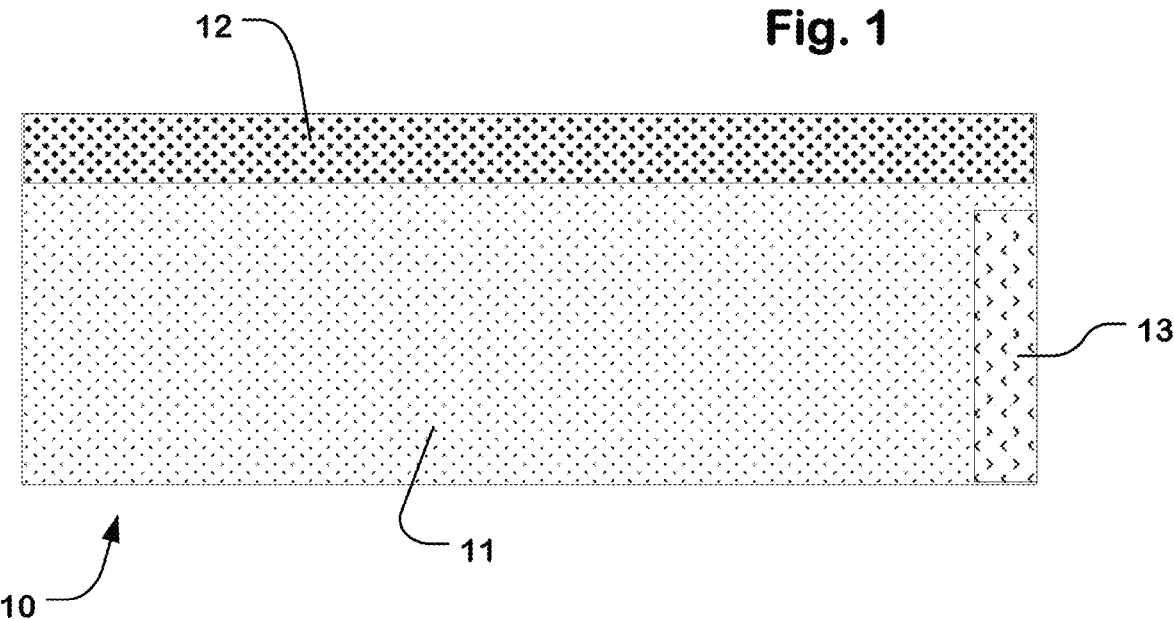
FIG. 1 is an illustration of a simplified component having a hardened first surface layer and a treated second surface layer having residual compressive stress.

FIG. 1 is a simplified diagram of a metal component 10 including a component core 11 which comprises a metal, such as steel, titanium and titanium alloys, aluminum and aluminum alloys, nickel-based alloys and so on. The material of the core 11 can be brought to a desired level of hardness as discussed below. The component 10 has a surface hardened, first surface layer 12 in a first area on the surface of the component, and a surface compressive-stress treated, second surface layer 13 in a second area. The second surface layer has residual compressive stress different than the first surface layer, and has hardness different than the first surface layer, the same as or different than that of the core.

The component 10 in some embodiments can be a relatively high strength material such as tool steel, which can be made relatively hard. Tool steel is a variety of carbon and alloy steels well-suited to be made into tools. A tool steel for the purposes of the present application is carbon steel or alloy steel having a carbon content between 0.5 weight % and 1.5 weight %.

In some embodiments, the component 10 can be subjected to a through-hardening treatment during the manufacturing process. Through-hardening can be applied to components made using tool steels, and to components made using other metals.

The surface hardened, first surface layer 12 can be formed by a surface hardening process (where a surface hardening process can include a case hardening process), such as carburizing which results in the first surface layer 12 having a greater carbon concentration than the core 11 of the component. Also, first surface layer 12 can be formed by a nitriding process, which results in a greater nitrogen concentration in the first surface layer 12 than in the core 11 of the component. In yet another embodiment, the first surface layer 12 can be formed using a directional hardening process, such as a directional ion beam which carries carbon or other material into the first surface layer 12 according to a pattern that excludes other areas, such as the second surface layer 13.

The first surface layer 12 can comprise a film of hard facing alloy according to a pattern on the core 11 of the component. Alternatively, the component core can be coated with a hard facing alloy prior to applying the surface hardening treatment and the second surface treatment to induce compressive stress. In this embodiment, the first surface layer 12 and the second surface layer 13 could include all or part of the hard facing film in their respective areas.

The first surface layer 12 can have a thickness, for reference, on the order of 1 to 15 millimeters, for example, or other thicknesses depending on the surface hardening treatment applied and the component being formed.

The second surface layer 13 can have a thickness, for reference, on the order of 0.5 to 10 millimeters, for example, or other thicknesses depending on the compressive stress inducing treatment applied and the component being formed. The second surface layer 13 in the second area can be formed in a surface hardened layer in the second layer, in embodiments in which a second surface hardening treatment is performed in the second area.

Figure 2:
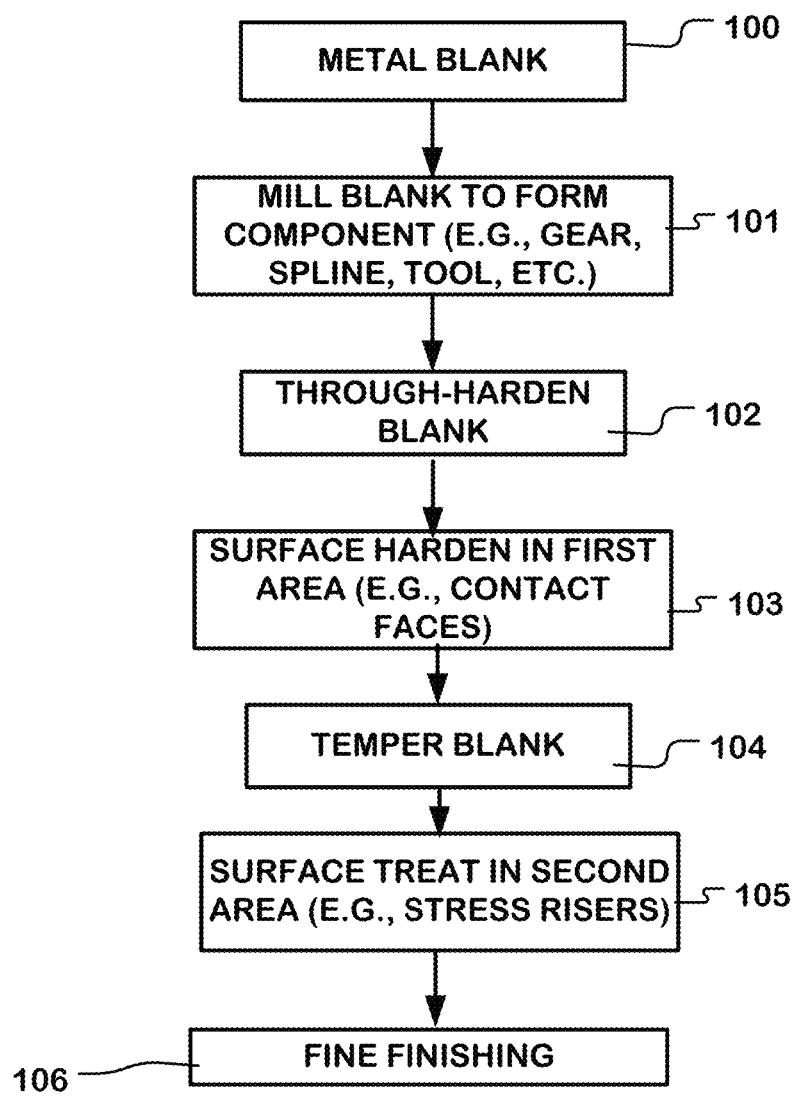
FIG. 2 is a simplified flowchart of a method for manufacturing a component such as that illustrated in FIG. 1.

FIG. 2 is a simplified flowchart of a method for manufacturing a component as described with respect to FIG. 1. The process starts with a metal blank (100).

The blank is milled to form the component (101). The component is characterized by having a first area which can be subject to wear or contact fatigue, and a second area which can be subject to bending, axial and/or torsional stress loading.

A through-hardening treatment is applied to the blank (102). This treatment increases the hardness of the core 11 of the component 10.

Although one would typically apply through-hardening after milling, the through-hardening and milling steps can be performed in any suitable order, and can be executed in multiple steps at different stages of the manufacturing process. In a through-hardening process, the core can be taken up to a hardness of for example 50 to 52 HRC in some embodiments. A surface hardening treatment can be applied at this stage in the second area, excluding the first area, can be in addition to, or in conjunction with, the through-hardening, or can be instead of the through-hardening.

An area-selective, surface hardening treatment is applied in a first area on the surface of the component, to form a first surface layer 12 which has a hardness greater than the hardness of the core 11 (103). Surface hardening can be executed with or in conjunction with through hardening, as in the case of a carburizing process in which the through hardening and surface hardening in first area occur simultaneously. Then the part is tempered in this example (104). As a result of the surface hardening treatment, the first surface layer can have a hardness in the range of 60 to 65 HRC in some embodiments. The surface hardening treatment is applied in a pattern, so that it includes at least part of the first area, and excludes at least part of the second area. In many, or even most, cases the through hardening will be done simultaneously with the surface hardening of the first surface layer. When we use a mask to stop the carbon diffusion into the root radii of a gear or the radius of a torqueing tool, that mask prevents the carbon from going into these areas. Thus, the heat treatment increases the hardness and thus yield strength of the entire component (i.e. gear or torqueing tool raised to RHC 54) but does not bring the hardness up to the level that makes it lose fatigue strength (RHC 62). At the same time the carbon can diffuse into those areas without the mask and generate this surface hardening treatment which makes these areas (i.e. faces and flanks) very hard (RHC 62). If this is done simultaneously, both to the masked areas which will only through-harden and to the unmasked areas which will receive the carbon diffusion, the hardening is done in the high temperature high carbon atmosphere and then completed by the proper fast cooling, called quenching. For other hardening applications, such as directed ion beam, the hardening of the entire component could be done prior to the surface hardening treatment.

A second surface treatment, which is different from the surface hardening treatment used to form the first surface layer 12, is applied in at least a part of a second area (105). As a result of the second surface treatment, the second surface layer 13 is formed. The second surface layer 13 has a hardness different than the hardness of the first surface layer 12, and has residual compressive stress that is preferably greater than, the residual compressive stress in the first surface layer 12. A combination of yield strength (e.g. imparted by through-hardening) and residual compressive stress optimizes fatigue strength in the area of the second surface layer 13. The higher hardness in the first surface layer 12 improves wear but increases brittleness thereby reducing fatigue strength whereas the lower hardness and equal or higher residual compressive stress in the second surface layer 13 optimizes fatigue strength there.

A last step in the flowchart includes applying processes to the component for fine finishing (106).

Fine finishing can include grinding and fine grinding as the means of achieving a desired final shape and a final desired surface finish. Also, iso-finishing can be used as the means of achieving the desired final surface finish. Also the fine finishing can include using rotary-tool polishing.

The area-selective surface hardening processes in the first and second areas for various embodiments of the manufacturing method can include various heat treat hardening methods, such as atmospheric carburization (also called carburizing), deep-case carburization for depths over 2 mm (0.080 inch), vacuum and low pressure carburization for minimizing surface oxidation, gas nitriding and nitrocarburizing, and plasma (ion) nitriding. The area-selective surface hardening processes can include heat treating in a carbon atmosphere. The area-selective surface hardening processes can include induction heating. The atmosphere during the heat treatment has an elevated carbon content higher than that of the material being hardened thereby enabling the carbon content of the material to increase during the hardening process.

Selectivity for area-selective surface hardening can be accomplished using masking techniques. With respect to masking, various techniques can be employed, including copper plating, stop-off paints, physical masking and leaving excess stock allowance that can be ground off later. The carbon or nitrogen used in the surface hardening process can diffuse into the material for example about 0.040 to 0.060 inches in depth (1 mm to 1.5 mm). In some embodiments, the diffusion can penetrate as much as 0.25 inches (12.5 mm). A physical mask could be any material of sufficient thickness and temperature resistance (roughly 1400° F.) to prevent the carbon or nitrogen from diffusing into the surface to be protected. Platinum and palladium can be used for some materials, including specialized materials like titanium but are extremely expensive.

For example, carburizing can be done for surface hardening in an atmosphere with higher carbon content than is used in a through-hardening process for the same component. During a heat treating process with a high carbon atmosphere, areas that are masked with copper will not absorb the carbon and thus only through-harden when quenched.

Plating techniques can be applied to form masks. Properly applied copper plating is considered a good method for some components, but can be costly. It can be used in both atmosphere and vacuum carburizing. A nickel layer (nickel flash) can be used as an under layer for improved copper adhesion.

Paints can be used as masks. Stop-off paints are used either as an alternative to copper or for touch-up on plated surfaces. Such paints can include solvent- or water-based coatings with copper or boron as the main ingredient. For deep-case carburizing, silicate-based paints can be used. In some cases, boron-based paints can be used as well. Silicate-based copper-oxide paint can be used with vacuum carburizing. Paint for gas nitriding and nitrocarburizing usually includes fine tin power dispersed in a lacquer, consisting of a solvent and synthetic binder or water and synthetic emulsion.

Mechanical masking can be used in some processes. For ion nitriding, a suitable masking technology is mechanical shielding.

It is possible to apply area-selective surface hardening without masks using, for example, a directional surface hardening technique. One directional hardening technique can include a directed ion beam surface hardening process, which could carburize or nitride a local area in a pattern without need for a mask.

The second surface treatment, different than the surface hardening treatment, to impart residual compressive stress can be laser peening designed using for example one or more of variable laser beam pulse powers, variable pulse shape and variable pulse patterns, so that the compressive and tensile stresses generated by it smoothly match into the compressive and tensile stresses generated by the hardening process. Laser peening can be accomplished using technologies like those described in U.S. Pat. No. 7,750,266, which is incorporated by reference as if fully set forth herein. Laser peening and low plasticity burnishing can be especially effective because they generate low cold work and thus low hardening of the treated surfaces. The very low cold work introduced by laser peening can deliver residual compressive stress without undue increase in hardness and corresponding reduction in fracture toughness. Other treatments for inducing residual compressive stress include shot peening and cavitation peening.

After the surface hardening treatment, the mask can be removed and then cold work or other compressive stress inducing process applied to transition areas or other selected areas. In the case of laser peening for inducing compressive stress, some kinds of masks can be left in place during laser peening, and laser peening can be applied through them.

In some embodiments, the method can include through-hardening all the material and only carburizing to surface harden certain areas. Through-hardening can be done by heating in a neutral atmosphere to the austenizing temperature and then rapidly quenching to a martensitic structure. The through hardening process can include heating in an atmosphere including carbon carriers, such as methane, for sufficient times to diffuse the carbon into the core. After the heating process, a quenching and tempering process can be applied, that is configured for the particular component and materials being utilized. In some materials, such as tool steels and others, a secondary heating, quenching and tempering can be done.

Area-selective surface hardening combined with a process to add compressive stress to fatigue failure-prone areas is described for components that require high hardness in a contact area and bending, axial and torsional fatigue strength in another area. The root radii areas of gear teeth, pinions, splines, crankshafts, torqueing tools, etc. need fatigue strength and not so much hardness; fatigue strength is needed because the root takes the bending load on the tooth or the torsion of the shaft and hardness is not needed because the teeth or connecting rods do not contact there.

The area-selective surface hardening can be applied before the second surface treatment. The second surface treatment can be applied for example to geometrical transition areas experiencing high and repeated torque loading.

As mentioned above, area-selective surface hardening can result in somewhat lower yield strength in areas not subject to the hardening process. However, the areas subject to the second surface treatment can attain better overall fatigue strength. For example, fracture toughness can be higher without carburization (or other surface hardening process) and the separate peening treatment (or other second surface treatment) can provide the desired compressive stress. The method can involve through-hardening the entire component to an intermediate level of yield strength and hardness, before, during, in between or after, the selective hardening and second surface treatments.

Figure 3:
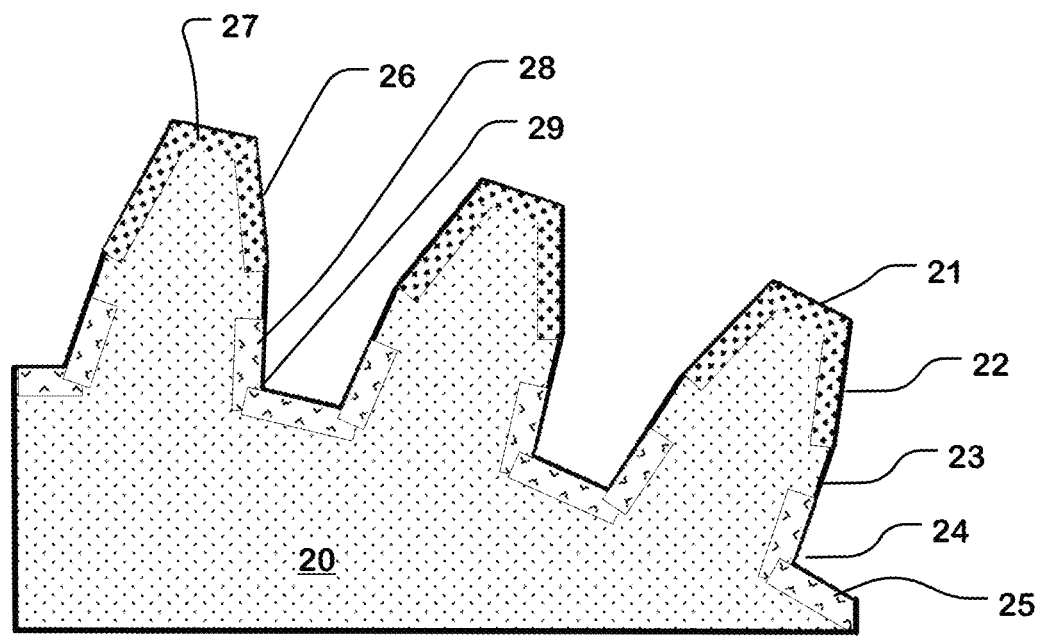
FIG. 3 illustrates a portion of a gear or similar component, having hardened first surface layers on contact faces, and treated second surface layers in root radii.

FIG. 3 illustrates a component such as a gear, a splined shaft, a rack, a pinion or a cog having teeth. The surface of the teeth include areas referred to as a top (e.g. 21), a face (e.g. 22), a flank (e.g. 23), and a fillet radius or root radius (e.g. 24) at the base (e.g. 25) of the teeth. A splined coupling can also have teeth, like those illustrated, which are configured in a manner complementary to teeth on a mating splined shaft.

Some or all of the face and some or all of the flank can be contact surfaces of the teeth. In this example, a surface hardened layer 26 is formed on part of the face and part of the flank, and in some cases across the top 27 of the teeth. The root radii (e.g. 24) are stress risers on the component. In this example, a surface compressive-stress treated layer includes portion 28 on part of the flank and portion 29 that extends across the root radius of the teeth. The core 20 of the component can be a through-hardened steel as described above.

The fatigue strength of the root radii of the gear teeth can be improved by masking carburization in this area, through hardening and inducing compressive stress in the masked areas by a surface treatment such as laser peening. In this approach, compressive stress is added in without the decrease in fracture toughness that results from carburization or other surface hardening processes.

Figure 4:
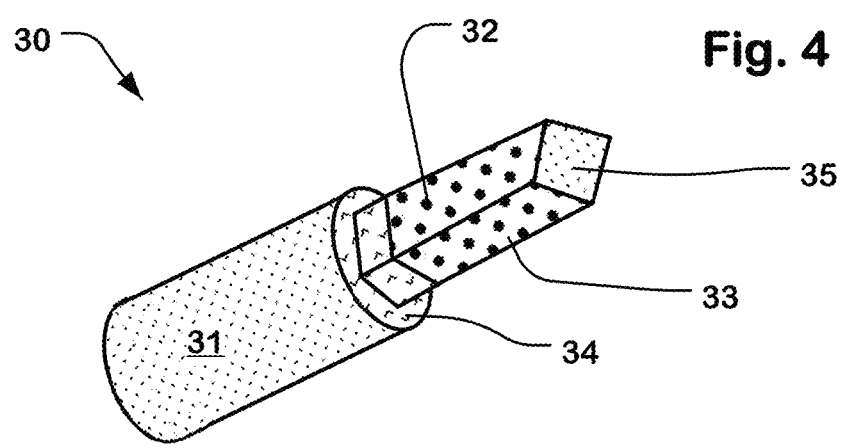
FIG. 4 illustrates a portion of a torqueing tool, having hardened first surface layers on contact faces, and treated second surface layers in a fillet region.

FIG. 4 illustrates a torqueing tool component 30 having contact surfaces 32, 33 typically extending around the diameter of the tool, a fillet area 34, a shaft 31 and a top 35. The torqueing tool component 30 can be manufactured using a process like that described with reference to FIG. 2. As suggested by the hatching in the diagram, the contact surfaces 32, 33 have a surface hardened layer formed therein as described above, and the fillet area 34 (extending up the contact surfaces 32, 33 in some amount) has a second surface layer having induced compressive stress different than the surface hardened layer on the contact surfaces 32, 33. The shaft in this example includes through-hardened material.

In a torqueing tool the "root radius" would be an area experiencing high torqueing loading but not contact loading with the component being torqued. For example, in a nut driver, the area in direct contact with the nut being tightened would be carburization/heat treated to attain the highest hardness and thus the least wear or distortion. A transition area to a shaft 31 delivering the torqueing loading would be considered the "root radius." The root radius in this example at the "fillet," that is the transition from the head which will engage the bolt being torqued to the main shaft that will connect to the power tool or wrench providing the torque.

Figure 5:
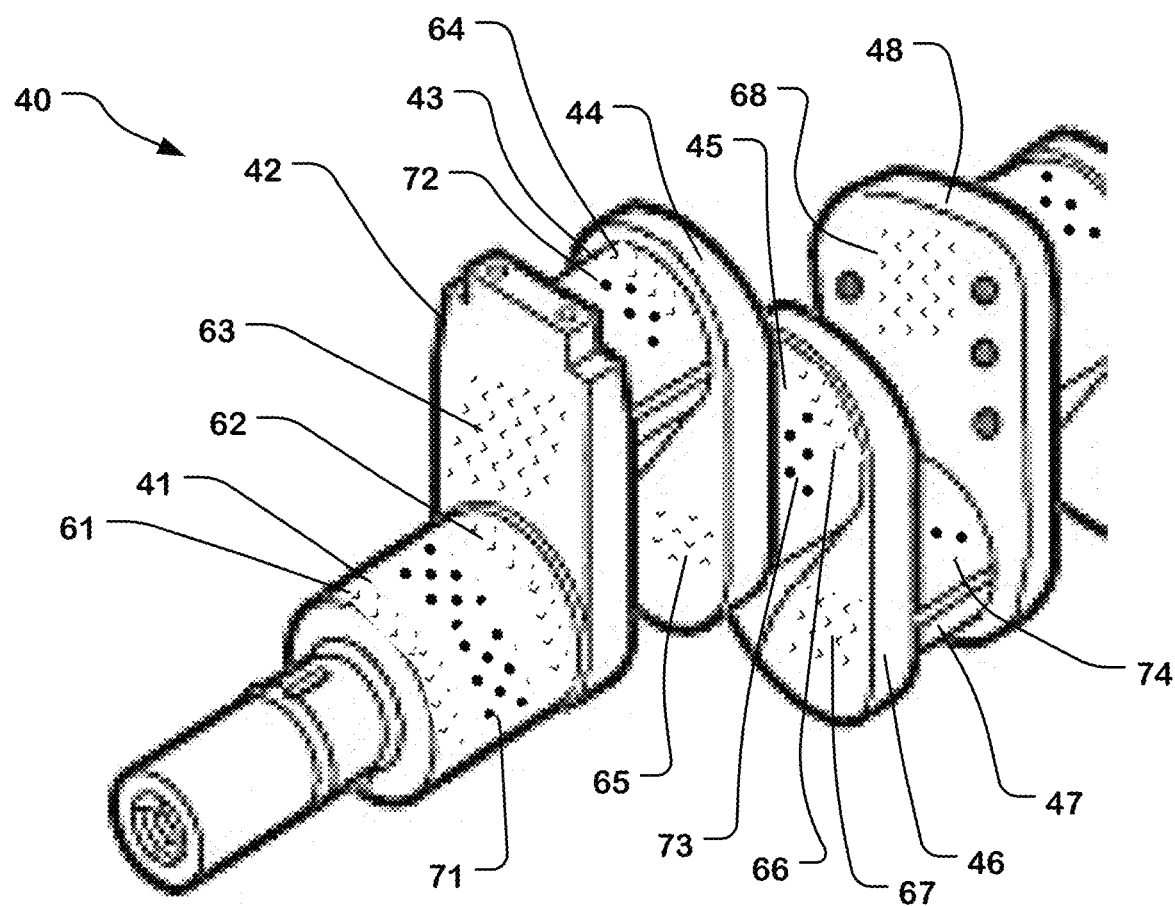
FIG. 5 illustrates a crankshaft having hardened first surface layers, and treated second surface layers.

FIG. 5 illustrates a portion of a crankshaft 40, which comprises a number of individual components assembled using complex machining and forging processes. The crankshaft includes main journals 41, 45 and crank pin journals 43, 47. The journals are joined using webbing 42, 44, 46, 48. The crank pin journals, where the piston connecting rods attach, and the main journals that mate with engine block bearings can have surface hardened layers 71, 72, 73, 74, on bearing areas of the journals. Also, in the fillet regions, second compressive-stress treated surface layers 61, 62, 64, 67 are disposed in transition areas the journals and webbing. The fillet regions do not experience much wear but can be subject to bending fatigue failure as a result of stress risers maximizing bending stress in operation. The second surface layers 61, 62, 64, 67 have lower hardness and optimized compressive stress, different than the surface hardened layers that can improve resistance to fatigue stress. Also, in the illustrated example, second surface layers 63, 65, 67, 68, having induced compressive stress different than the surface hardened layers, are also disposed on the webbing. Some or all of surface hardened layers 71-74 and the second surface layers 61-68 can be formed by exposing the component after assembly to a process such as that described herein. Alternatively, some or all of surface hardened layers 71-74 and the second surface layers 61-68 can be formed by exposing the individual components or sub-components before complete assembly to a process such as that described herein.

Figure 6:
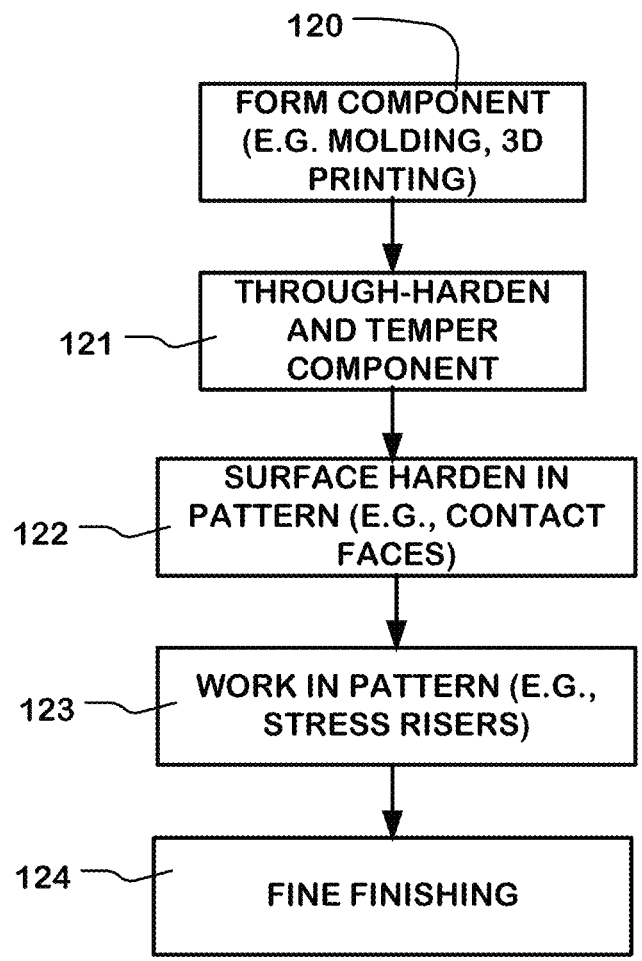
FIG. 6 is a simplified flowchart of an alternative method for manufacturing a component such as illustrated in FIGS. 1, 3, 4, and 5.
Figure 7:
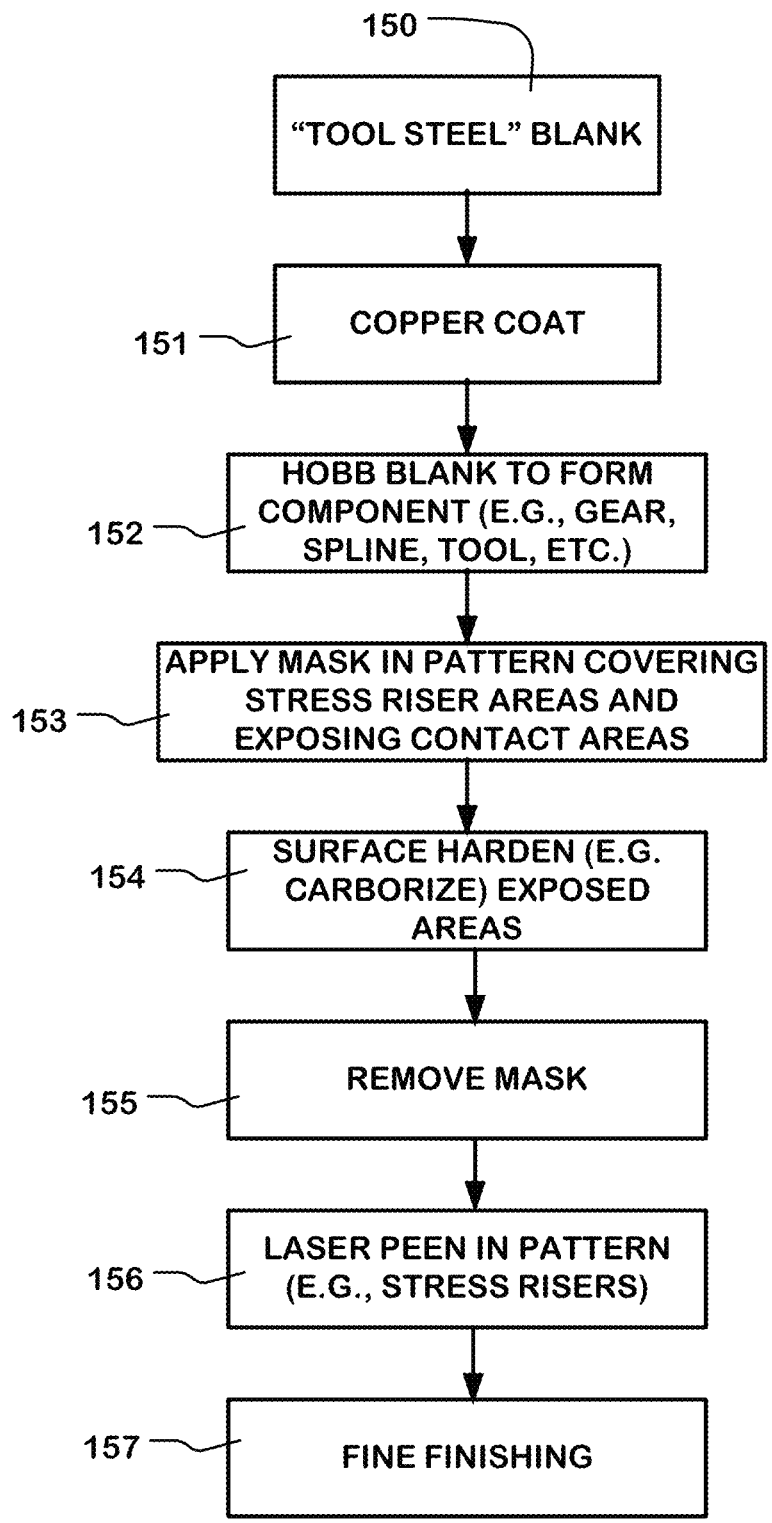
FIG. 7 is a simplified flowchart of yet another alternative method for manufacturing a component such as illustrated in FIGS. 1, 3, 4, and 5.

FIGS. 6 and 7 are flowcharts illustrating some alternative processes for manufacturing components such as described herein.

In FIG. 6, the component is formed using a molding process or other forming process rather than, or in combination with, a milling or machining process. In some embodiments, components are formed using additive manufacturing technologies involving adding successive layers of material under computer control, examples of which are known as 3D printing or rapid prototyping. These forming processes can be suitable for some types of components and some types of metals. The process of FIG. 6 begins with forming the component using, for example, a molding process (120). Also the process includes through-hardening and tempering the component to provide a durable core (121). The process includes applying an area-selective surface hardening process, by which a pattern is surface hardened on the component (122). The area-selective surface hardening process can result in formation of surface hardened surface layers on contact faces of the component, or other locations requiring wear resistance. The process includes working the component using an area-selective treatment different from the surface hardening treatment, such as laser peening, to induce formation of second surface layers having residual compressive stress (123). The residual compressive stress in the second surface layers is different from the residual compressive stress in the surface hardened surface layers on the component. The second surface layers can also have a hardness which is different from the surface hardened surface layers on the component.

The process includes fine finishing of the component (124), using such processes as are suitable to the particular component being manufactured.

FIG. 7 is a flowchart showing some additional details for embodiments of manufacturing processes, such as described herein. The process starts with a metal blank comprising tool steel in this example (150). Tool steel is chosen as an example of a process in which the blank may not require through-hardening for some types of components.

However for some components, a through-hardening treatment can be applied to the tool steel blank.

In this example, a copper coating is applied to the tool steel blank (151).

The blank is milled using a hobbing or machining process to form the component (152). For some components, a through-hardening treatment can be applied to the machined component at this stage. If through-hardening is applied prior to this stage to, for example, control distortion, then the hobbing or machining is done using tools suitable to machining the hardened material such as diamond surfaced grinding tools. The component can be a gear, a spline, a rack, a pinion, a cog, a torqueing tool or other component characterized by having a first area including contact areas which can be subject to wear or contact fatigue, and a second area including stress risers which can be subject to bending, axial and/or torsional stress loading.

After the hobbing process, a mask is applied, in this example covering stress risers in the second area and exposing contact areas in the first area (153).

After applying the mask, a surface hardening treatment such as carburizing is applied (154). This process results in formation of surface hardened surface layers which have hardnesses greater than the hardness of the core, in the areas exposed by the mask, while preventing or inhibiting surface hardening in areas covered by the mask. The surface hardening treatment is area-selective as a result of the mask and is applied in a pattern.

In the manufacturing process of FIG. 7, the mask can be removed (155). After removing the mask, a laser peening process is applied in a pattern to form treated surface layers having induced compressive stress on stress risers on the component, or other locations (156). Alternatively, other treatments, different from the surface hardening treatment applied at step 154, can be applied, as described herein for the purposes of inducing compressive stress. As result of the laser peening treatment, second surface layers are formed which have residual compressive stress that is different than, and preferably greater than, the residual compressive in the surface hardened layers of step 154.

In some embodiments, a treatment can be applied to form treated second surface layers having induced compressive stress through the mask (i.e., while some or all of the mask remains on the component). In such embodiments, it may not be necessary to remove the mask from the component or may not be necessary to remove the mask at this stage in the process.

The process of FIG. 7 includes fine finishing of the component (157) using such processes as are suitable to the particular component being manufactured.

In one embodiment, in which the components are gears or other components having gear teeth, the flanks and faces of gear teeth would be carburized for highest hardness but root radii would be specifically masked to avoid carburization while still receiving through-hardening during the carburization, and thus attaining relatively high yield strength. A surface treatment which imparts residual compressive stress would then be applied to the root radius areas. In another embodiment in which the components are nut driving (torqueing) tools, the tool areas contacting the nut are carburized for maximum wear, whereas areas along the tool shaft subject to stress induced by torsion are subjected to a surface treatment which imparts residual compressive stress to optimize torsional fatigue performance.

A method described herein can involve hardening to higher hardness surfaces that endure wear, and separately hardening, generally hardening to a lesser extent, areas requiring bending fatigue strength. A method of compressive residual stress, such as laser and/or shot peening, low plasticity burnishing or others, can be added to the areas needing bending fatigue strength, further improving the bending fatigue strength there. Both areas requiring high hardness and those requiring high fatigue strength can be optimized for performance by individually treating with one or more hardening steps and other treatments such as peening and superfinishing.

As an example, a blank disk made of "green" C64 Questek steel was copper coated, as a carbon stop, and then gear teeth hobbed into it. This exposed the gear teeth faces, flanks and roots. Next, to control hardness of the root areas, the roots were recoated with a carbon stop to prevent or limit carburization. Then the entire component was placed in an oven for carburization and heat treatment. The result was high hardness in the faces and flanks exposed to the carburization and no carburization but through hardening (due to the heat treatment) to the root area. Next the root, areas were laser peened to add compressive stress here, a step highly beneficial to good fatigue strength.

Further optimization of the process can include other treatment strategies. For example, omitting carburization in the roots does result in somewhat lower yield strength in areas not subject to contact wear but these areas attain better overall fatigue strength because fracture toughness can degrade with the hardness of high carburization. The lower hardness also enables more effective separate peening treatment of the roots to provide deep compressive stress that can greatly further increase fatigue strength. Also, a technique to further harden the root areas, increasing yield strength there to attain maximum fatigue strength, can be used. This could be done for example by area-selective hardening, such as local ion implantation, local laser hardening, etc. Then, a surface treatment which imparts residual compressive stress would be applied to the root radius areas. The addition of compressive stress to the root area can be accomplished by means such as laser peening, shot peening, roller burnishing, cavitation peening or a similar approach involving plastic deformation applied at the surface.

FIG. 8 is a flowchart illustrating an embodiment that includes first and second area-selective hardening treatments in the first and second areas, respectively, combined with a treatment to induce residual compressive stress in the second area. As in the example of FIG. 7, the process starts with the metal blank comprising tool steel in this example (850). Tool steel is chosen as an example of a process in which the blank may not require through-hardening for some types of components. However, for some components, a through-hardening treatment can be applied to the tool steel blank.

In this example, a copper coating is applied to the tool steel blank (851). The blank is nailed using a hobbing or machining process to form the component (852). For some components, a through-hardening treatment can be applied to the machined components at this stage. If through-hardening is applied prior to this stage to, for example, control distortion, then the hobbing or machining is done using tools suitable to machining the hardened material, such as diamond surface grinding tools. The component can be a gear, a spline, a rack, a pinion, a cog, a torqueing tool or other component characterized by having a first area including contact areas which can be subject to wear or contact fatigue, and a second area including stress risers which can be subject to bending, axial and/or torsional stress loading, creating fatigue stress.

After the hobbing process, a mask is applied, in this example covering the stress risers in the second area, and exposing contact areas in the first area (853).

After applying the mask, a surface hardening treatment such as carb arising is applied (854). This process results in formation of surface-hardened surface layers which have a first specified hardness greater than the hardness of the core, in the areas exposed by the mask. The mask however prevents or inhibits surface hardening in areas covered by the mask. The surface hardening treatment is area-selective as a result of the mask and is applied in a pattern. Thereafter, the mask can be removed (855). Of course other surface hardening techniques that may be area-selective without relying on a mask, may be applied.

In this example, the process includes applying a second mask in a pattern covering the contact areas, and exposing the stress risers in the second area (856). Then, a treatment is applied to surface harden the exposed areas to a second specified hardness (857). Then, the second mask can be removed (858). As mentioned above, other surface hardening techniques may be applied which are area-selective, and may not require utilization of a mask. Also, a treatment is applied, such as a laser peening process, in a pattern to form treated surface layers having an induced, residual compressive stress on stress risers on the component in the second area, or on other locations in the second area (859). The treatment to induce residual compressive stress can be applied only in parts of the second area, and exclude the first area.

A fine finishing step can be applied to the finish formation of the component (860).

As a result of the area-selective, second surface hardening treatment, combined with the treatment to form induced residual compressive stress, the treated parts of the second area have a second hardness, less than the first specified hardness in the first area. The second hardness can be optimized by tuning the hardness treatments to achieve a high fatigue strength.

FIGS. 2, 6, 7 and 8 are flowcharts illustrating manufacturing steps in various combinations. It will be appreciated that some of the steps might be combined or performed in a different sequence. Also, the steps in the various examples can be substituted for corresponding steps in other examples, to provide additional variations of the technology. In some cases, as the reader will appreciate, a rearrangement of steps will achieve the same results only if certain other changes are made as well. In other cases, as the reader will appreciate, a rearrangement of steps will achieve the same results only if certain conditions are satisfied. Furthermore, it will be appreciated that the flow charts herein show steps pertinent to an understanding of the invention, and it will be understood that numerous additional steps for accomplishing other functions can be performed before, after and between those shown.

Using the technology described herein, areas subject to fatigue loading but not needing wear resistance, such as root radii of the gears, can be masked off or otherwise not exposed to the surface hardening process like heat treating/carburization so that their yield strength is increased. Although this increase in yield strength may be somewhat less than the increase generated by carburization of the entire surface, it is achieved without significantly decreasing the fracture toughness. Since through-hardening (that can occur during carburization) does not add compressive stress in the areas that flex or torque, this deficit in residual compressive stress can then be very effectively addressed with a compressive stress inducing process such as laser peening, which involves cold working.

With the hybrid treatment approach described herein, one can optimize yield strength, fracture toughness and residual compressive stress for high bending or torque fatigue strength in the root radius areas, and also achieve the high hardness and compressive stress desired in the contact surfaces, for compressive contact loading and wear resistance.

The fatigue limit can be increased to high cycle fatigue limits by limiting the increase in hardness in root radii areas to achieve moderately high yield strength, such as hardness in the range of 50 HRC, followed by a surface treatment such as laser peening to add desirable compressive stress to achieve the highest fatigue strength in the root radii area.

Laser peening (and other cold work surface processes) can also be controlled for area-by-area intensity, the sequential order of application across the work piece, and depth of treatment, thus allowing a much greater degree of optimization of the fatigue strength. Thus, the desired fatigue strength can be attained in, for example, gear root radii, by through-hardening without carburization, and laser peening to increase fatigue strength in that area.

As described herein, one can fabricate a gear blank of the desired steel in low strength (green) condition, coat all surfaces with copper and hob in the desired gear teeth shape, mask the root radii area and heat treat to desired hardness for faces and flanks, laser peen the root radii areas and remove copper masking, and fine grind to final shape and iso-finish as desired.

As described herein, one can fabricate a crankshaft, heat treat in a neutral atmosphere to attain a high tensile strength, mask root radii and other high stress non-contact areas leaving connecting rod and bearing contact surfaces unmasked, nitride or carburize the shaft to obtain high hardness in the unmasked areas, laser peen the root radii and other high stress non-contact surfaces, and surface finish as desired.

As described herein, one can fabricate a torqueing tool such as a large dimension nut driver, heat treat the tool to a high strength level, mask root radii and other high stress but non-contact areas, carburize to obtain high hardness in contact areas such as a nut-contact area, and laser peen the root radii and other high stress non-contact surfaces.

Many variations are described herein, including a method of manufacturing a component subject to high wear or contact fatigue in one area, and high bending, axial and/or torsional stress loading in another area, by through-hardening the entire component to achieve elevated yield strength, surface hardening only the wear-contact surfaces, and subsequently surface treating high stress areas subject to fatigue failure, to provide desired residual compressive stress, and consequent fatigue strength and lifetime. Alternatively, surface hardening can be applied in both the wear-contact surfaces and the high stress areas subject to fatigue failure, to achieve optimal or close to optimal hardness levels in both areas.

The method can include using heat treatment in a neutral carbon atmosphere as the means of achieving elevated yield strength.

The method can include using laser peening as the compressive stress inducing surface treatment.

The method can include shot peening as the compressive stress inducing surface treatment.

The method can include using cavitation peening as the compressive stress inducing surface treatment.

The method can include using low plasticity burnishing as the compressive stress inducing surface treatment.

The method can include using carburization as the surface hardening method.

The method can include using nitriding as the surface hardening method.

The method can include using induction heating as a through hardening method.

The method can include using laser hardening as the surface hardening method.

The method can include forming the component using additive manufacturing processes, including 3D printing.

The method can include using grinding as the means of achieving a desired final shape.

The method can include using iso-finishing as the means of achieving the desired final surface finish.

The method can include using rotary-tool polishing as the means of achieving the desired final surface finish.

The method can be applied in manufacturing of a gear with gear faces and flanks surface hardened, and root radii not exposed to the surface hardening treatment and surface compressive-stress treated.

The method can be applied in manufacturing of a torqueing tool with contact surfaces surface hardened, and non-contact high stress areas not exposed to the surface hardening treatment and surface compressive-stress treated.

The method can be applied in manufacturing of a crankshaft with contact surfaces surface hardened, and non-contact high stress areas not exposed to the surface hardening treatment and surface compressive-stress treated.

The method can be applied in manufacturing of a rack with contact surfaces surface hardened, and non-contact high stress areas not exposed to the surface hardening treatment and surface compressive-stress treated.

The method can be applied in manufacturing of a cog with contact surfaces surface hardened, and non-contact high stress areas not exposed to the surface hardening treatment and surface compressive-stress treated.

The method can be applied in manufacturing of a splined shaft and/or a splined coupling with contact surfaces surface hardened, and non-contact high stress areas not exposed to the surface hardening treatment and surface compressive-stress treated.

A component is described herein having selectively hardened contact surfaces and cold worked surfaces with or without tuned surface hardening in areas subject to loading.

A component is described herein having selectively hardened contact surfaces and laser peened surfaces with or without tuned surface hardening in areas subject to loading.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method of manufacturing a component subject to wear or contact fatigue in a first area, and bending, axial and/or torsional stress loading in a second area, comprising:
    applying an area-selective surface hardening treatment to harden a first surface layer of the component to impart a first level of hardness in a pattern that includes at least part of the first area and excludes at least part of the second area; and
    applying a second treatment, different than the surface hardening treatment, to impart a second level of hardness less than the first level of hardness, and residual compressive stress in a second surface layer of the component including at least said part of the second area and excluding the first area.

2. The method of claim 1, including through-hardening the component.

3. The method of claim 1, wherein the component comprises a tool steel.

4. The method of claim 1, including applying a mask in the second area before applying said surface hardening treatment in the first area.

5. The method of claim 1, including inhibiting surface hardening in the second area while applying said surface hardening treatment in the first area.

6. The method of claim 1, wherein said area-selective surface hardening treatment includes using a directional surface hardening process.

7. The method of claim 1, wherein said area-selective surface hardening treatment includes using a directional ion beam surface hardening process.

8. The method of claim 1, wherein said area-selective surface hardening treatment includes heat treatment in an atmosphere comprising carbon.

9. The method of claim 1, wherein the second treatment includes applying another surface hardening technique to the second area.

10. The method of claim 1, wherein the second treatment includes applying a surface hardening technique that is area-selective excluding the first area.

11. The method of claim 1, including prior to said applying the area-selective surface hardening treatment, applying an initial surface hardening technique to the first area and the second area.

12. The method of claim 1, wherein said second treatment includes cold working.

13. The method of claim 1, wherein said second treatment includes cold rolling.

14. The method of claim 1, wherein said second treatment includes low plasticity burnishing.

15. The method of claim 1, wherein said area-selective surface hardening treatment includes carburization.

16. The method of claim 1, wherein said area-selective surface hardening treatment includes nitriding.

17. The method of claim 1, wherein said area-selective surface hardening treatment includes induction heating.

18. The method of claim 1, wherein said area-selective surface hardening treatment includes laser hardening.

19. The method of claim 1, including grinding the component to achieve a desired shape after said applying the second treatment.

20. The method of claim 1, including iso-finishing the component to achieve a desired surface finish after said applying the second treatment.

21. The method of claim 1, including rotary-tool polishing the component to achieve a desired surface finish after said applying the second treatment.

22. The method of claim 1, wherein the component is a gear, and the first surface layer includes at least one of gear faces and flanks, and the second surface layer includes root radii.

23. A method of manufacturing a component subject to wear or contact fatigue in a first area, and bending, axial and/or torsional stress loading in a second area, comprising:
    masking the second area, heating the component, diffusing a hardening element into the first area while the masking prevents the hardening element from contacting the second area, then quenching and tempering the entire component, including the first and second areas, to through-harden the component, and to impart a first level of hardness in a pattern that includes at least part of the first area and excludes at least part of the second area; and thereafter
    applying a second treatment, different than the surface hardening treatment, to impart a second level of hardness less than the first level of hardness, and residual compressive stress in a second surface layer of the component including at least said part of the second area and excluding the first area.

24. A method of manufacturing a component subject to wear or contact fatigue in a first area, and bending, axial and/or torsional stress loading in a second area, comprising:
    applying an area-selective first surface hardening treatment to impart a first level of hardness in a pattern that includes at least part of the first area and excludes at least part of the second area;
    applying an area-selective second surface hardening treatment in a pattern that includes at least part of the second area and excludes the first area; and
    applying a compressive stress treatment, different than the first and second area-selective surface hardening treatments, to impart residual compressive stress in a pattern that includes said at least part of the second area and excludes the first area,
    wherein said at least part of the second area after said compressive stress treatment and said second surface hardening treatment has a second level of hardness lower than the first level of hardness.

25. The method of claim 24, including through-hardening the component.

* * * * *